Nov. 25, 1952 — C. W. BLAZER — 2,619,337
DISTILLATION COLUMN TRAY CONSTRUCTION
Filed April 26, 1947 — 3 Sheets-Sheet 1
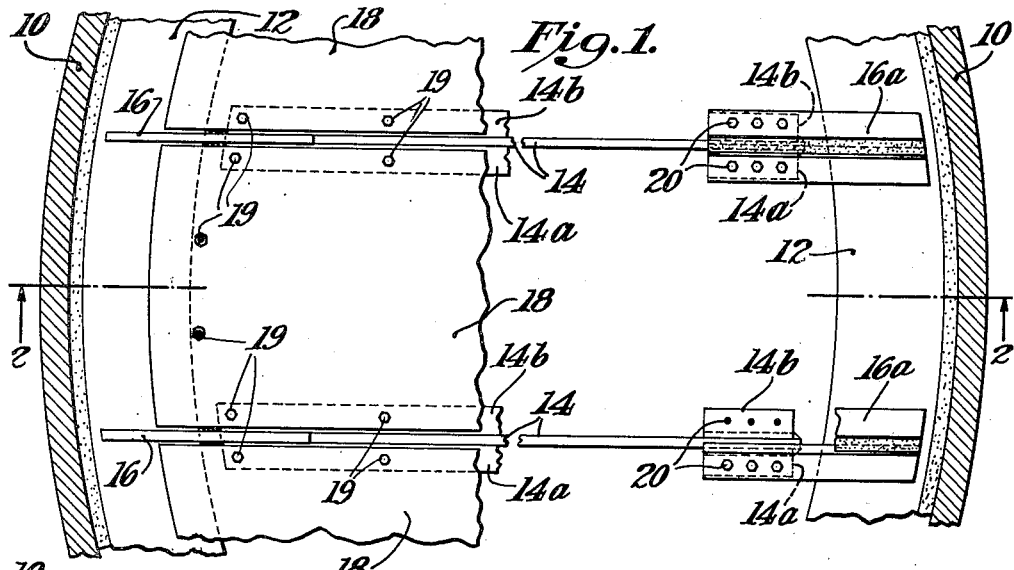
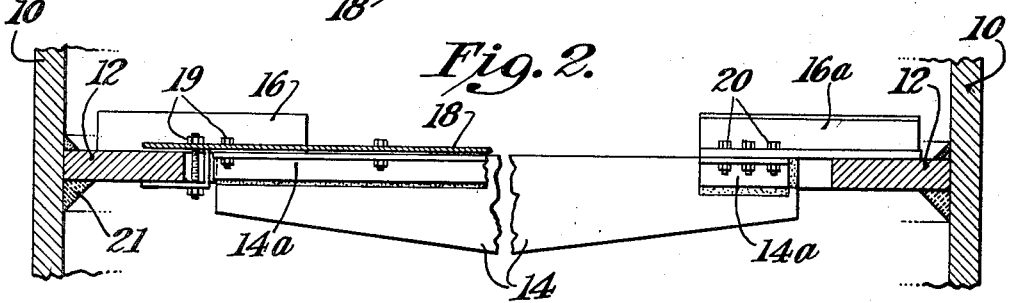
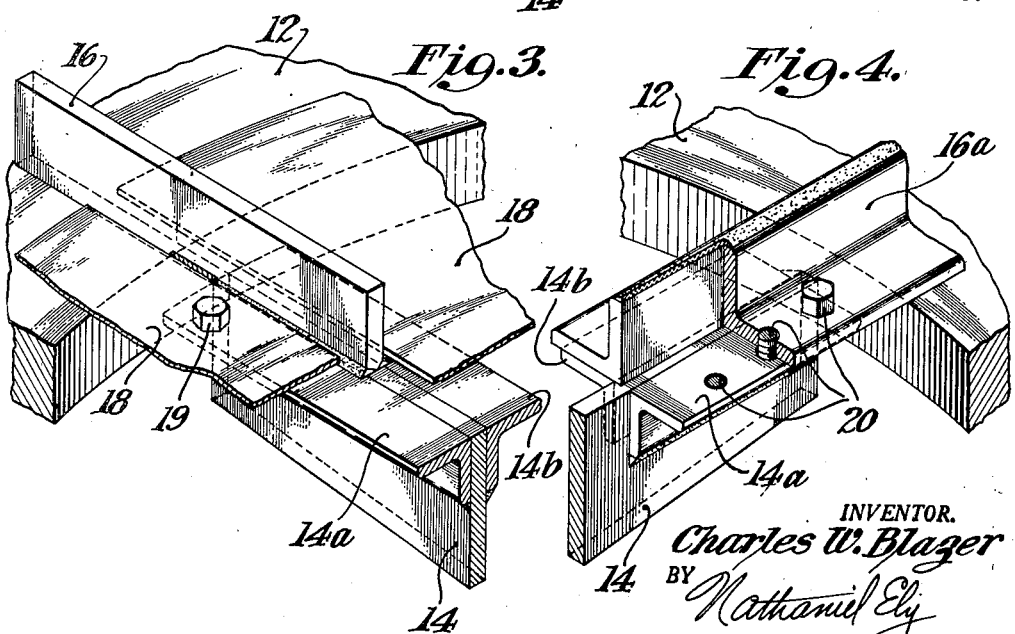
INVENTOR.
Charles W. Blazer
BY Nathaniel Ely
ATTORNEY

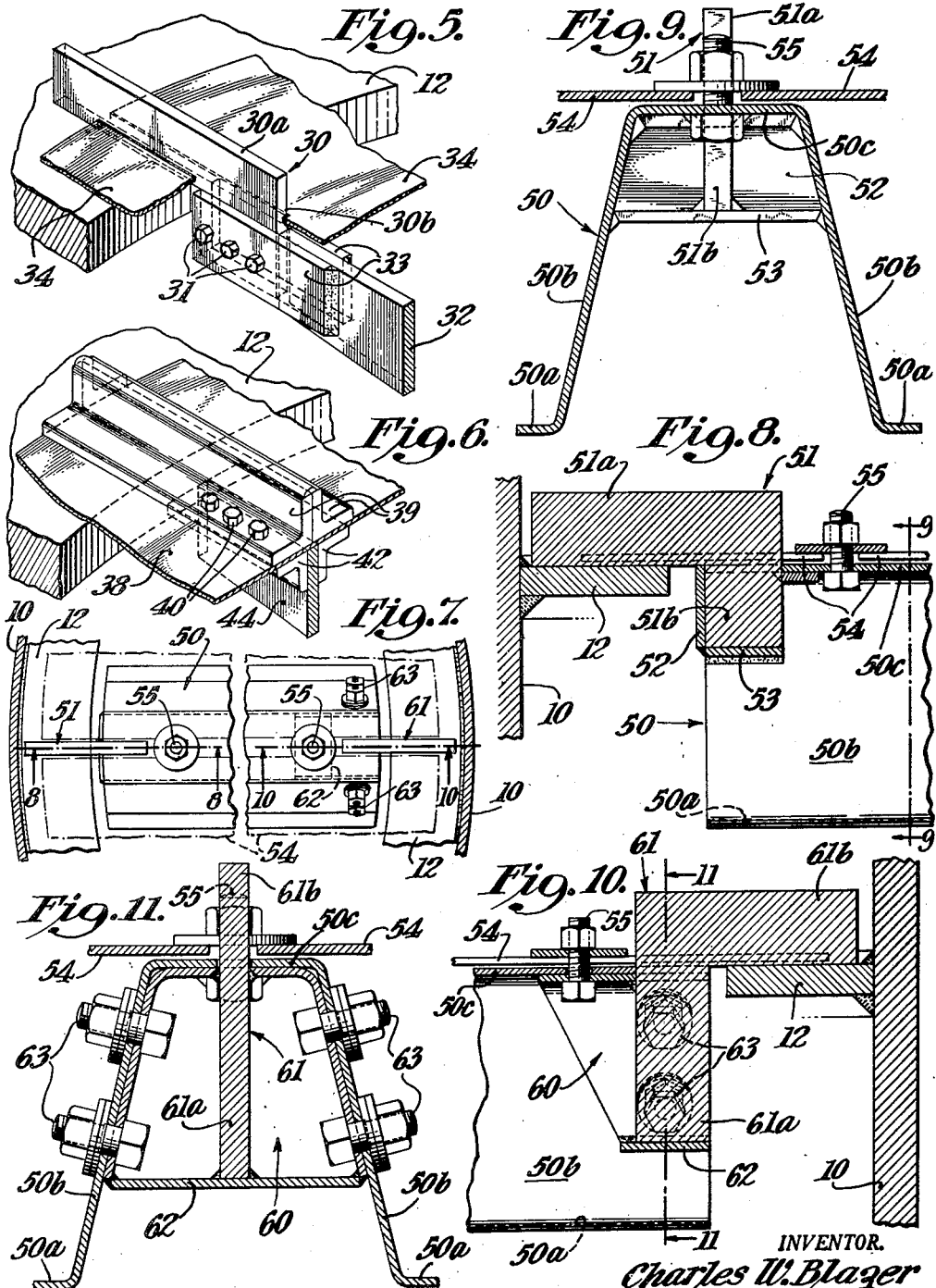

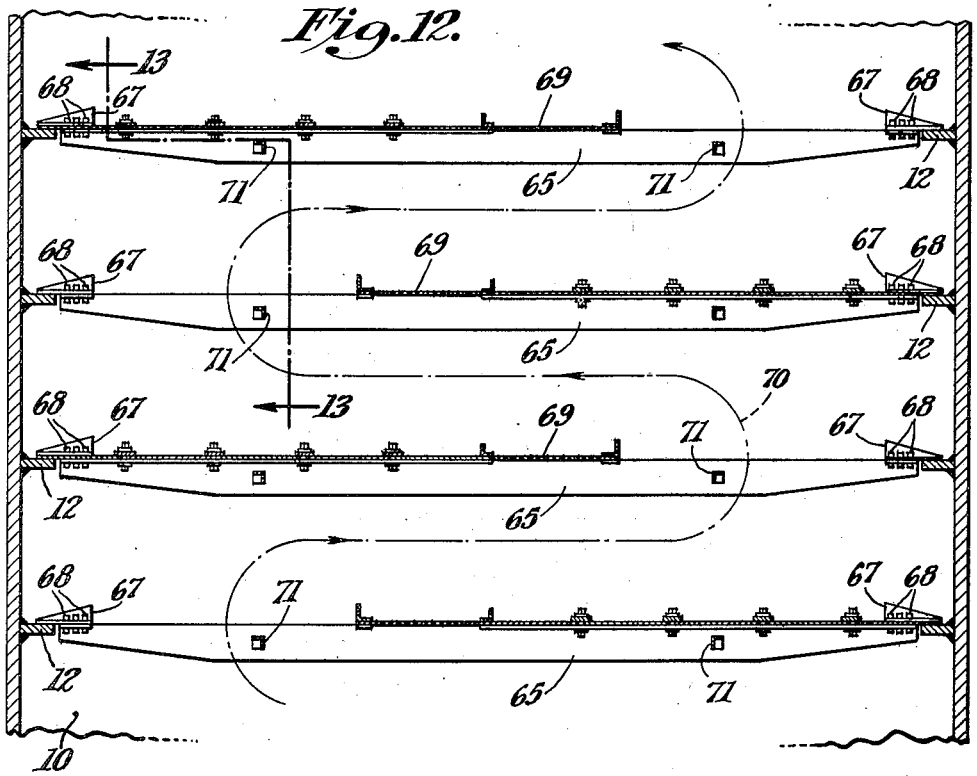
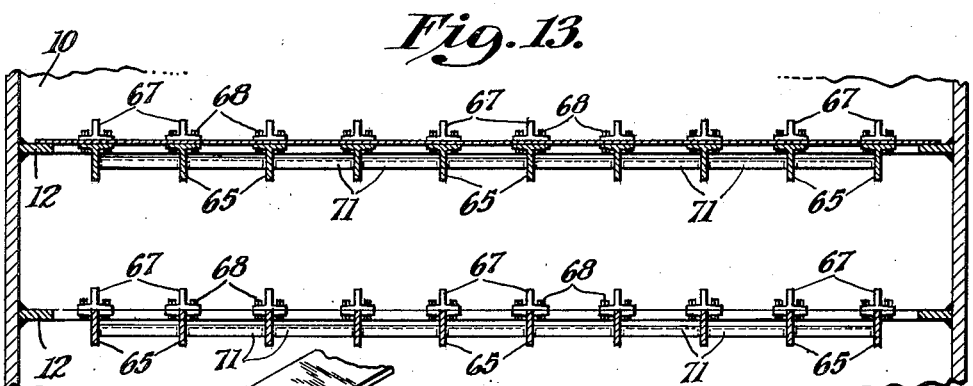
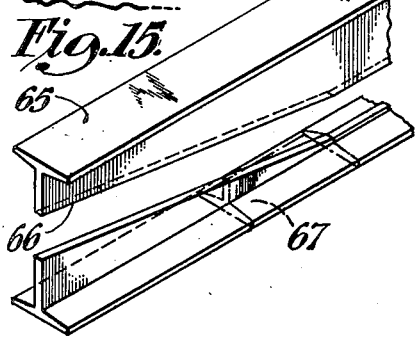
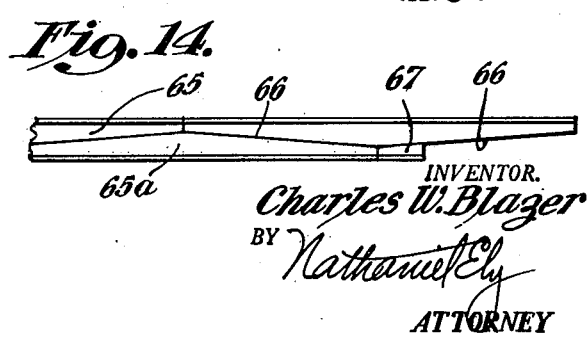
INVENTOR.
Charles W. Blazer
BY Nathaniel Ely
ATTORNEY Patented Nov. 25, 1952

2,619,337

UNITED STATES PATENT OFFICE 2,619,337

DISTILLATION COLUMN TRAY CONSTRUCTION

Charles W. Blazer, Rochester, N. Y., assignor to The Lummus Company, New York, N. Y., a corporation of Delaware Application April 26, 1947, Serial No. 744,053

2 Claims. (Cl. 261—113)

This invention relates to improvements in distillation or rectifying columns and more particularly applies to vacuum distillation equipment including tray construction details.

It is the principal object of my invention to provide an improved bubble or shower tray construction for a vacuum tower in which the tray beams are so arranged that there is greater available vapor area between trays so that the trays can be put closer together than customary, thereby reducing the overall column height.

Another object of my invention is to provide an improved beam construction for the trays of a distillation column whereby greater rigidity and easier installation can be obtained and whereby the beams are free to float on the reenforcing rings thereby avoiding buckling of the equipment.

A still further object of my invention is to provide a beam construction for tray supports in which the full strength and material of a standard steel shape can be used with substantial economy of construction and saving of weight.

Further objects and advantages of my invention will appear from the following description of preferred forms of embodiment thereof, taken in conjunction with the attached drawings illustrative thereof and in which:

Fig. 1 is a partial horizontal cross section of a vacuum column with parts of the tray in plan.

Fig. 2 is a vertical central section taken substantially along the line 2—2 of Fig. 1.

Figs. 3 and 4 are perspective views showing details of the manner of attaching tray beam ends to the column.

Figs. 5 and 6 are perspective views of other forms of end supports for tray beam ends.

Fig. 7 is a partial horizontal sectional view similar to Fig. 1 and showing a modified manner of securing a box beam to the reenforcing ring of a vacuum tower.

Fig. 8 is a vertical cross section of one end of a box beam taken substantially on the line 8—8 of Fig. 7.

Fig. 9 is a transverse vertical section of a box beam taken substantially on the line 9—9 of Fig. 8.

Figs. 10 and 11 are views similar to Figs. 8 and 9 being respectively vertical sections on the line 10—10 of Fig. 7 and 11—11 of Fig. 10 and showing modified forms of beam end construction.

Fig. 12 is a substantially central vertical section showing a typical shower tray unit mounted on a modified form of beam construction.

Fig. 13 is a section taken substantially along the line 13—13 of Fig. 12.

Fig. 14 is a side elevation of a part of an I beam showing cutting marks.

Fig. 15 is an isometric, exploded view of one end of the I beam showing the method of cutting.

In the construction of large vacuum towers the support of bubble trays or shower decks has become a major problem. When individual gusset plates are used, these must be carefully spotted in place to conform to tray beam spacing. The reenforcing ring also adds to the complications of tray mounting for it usually extends inwardly for seven or more inches. As a result, suggestions have been made for securing the supporting beams to the reenforcing ring. This is also impractical in that it is then impossible to pre-fabricate any substantial part of the trays so that they can be inserted in the column. It is apparent that the beams must be short enough so that they can pass downward past the various reenforcing rings. As a result, the cost of large columns has been excessive and the difficulties of assembly, great.

In the practice of my invention, I can use typical bubble type trays or shower decks, using beams which may be built in the shop and by providing unique end connections, I can secure the beam to the reenforcing ring regardless of supporting angles. Only a relatively small shear reenforcement for the usual ring is required, and special indexing of beams and gusset plates may be eliminated.

As one example of this arrangement, I have shown in Fig. 1, a column 10, in which a reenforcing ring, 12, is suitably mounted. As previously mentioned, this may be as much as seven inches in width. The main tray beams 14 extend within the annular opening in the ring 12 and are supported on the ring as by beam extension pieces 16 and 16a. It is to be understood that beams of different length are required to support the tray in its place.

The details of the beam 14 and extension piece 16 are shown in Fig. 3.

The beam when of alloy material may be fabricated with a central web 14 and a pair of abutting angles 14a and 14b which are conveniently welded or integrally secured together. The top flange portions are in a plane to which the fixed beam extension piece 16 is welded. The beam extension piece then projects beyond the end of beam 14 and overlies the ring 12. The deck or tray 18 which may be of bubble cap or shower type closely fits around the beam piece 16 and covers the top flanges of angles 14a and 14b and also overlies the ring 12 between beams. Bolts 19 may be used to hold the plates in sealed relation to the beams and the ring. The beam itself is thus free to expand and contract and all buckling is avoided.

The detachable beam end extension 16a shown in Fig. 4 is conveniently formed of a pair of angles 16a welded back to back and suitably bolted as by bolts 20 to the angle members 14a and 14b which are secured to the opposite end of beam 14. The angles which form extension piece 16a, extend outwardly to overlie the reenforcing ring 12. As shown in Figs. 1 to 4, the right hand edge of the tray 18, if a shower tray, does not extend over the reenforcing ring as is the case with a bubble tray. If a bubble tray is used, it will extend across the entire area, except for well known downcomers. In any event the spaces between the depending web portions of the T shape in cross-section beams 14 are substantially unobstructed.

It will thus be readily apparent that one end of each of the beams may be detachably secured to the beam and that it offers adequate strength to support the trays. Ordinarily the trays are not very heavy and the minimum support is sufficient. The other end (left end shown in Figs. 1, 2 and 3) also may be detachably anchored although I prefer to use the fixed extension piece 16. By inclining the tray one set of the extension pieces may be initially secured in position without interfering with the passing of the tray downwardly through the column. The extension pieces 16 and 16a rest freely on the upper side of ring 12 and support the beams 14 within the ring with their upper surfaces in the same plane as the upperside of the ring.

Suitable packing for the edges of the tray 18 while not shown, may be used to make the joints tight.

A modified form of embodiment of my invention is shown in Fig. 5. In this case, the removable beam extension 30 is of L shape having the overhanging leg 30a and the depending leg 30b. The depending leg may be secured, as by bolts 31, to the beam end by mounting between suitable plates 33 which may be welded to the beam 32 to make a stable construction. The tray may be completed by a horizontal plate 34 which may be either a shower tray plate or bubble tray plate as desired.

Another form of embodiment is shown in Fig. 6 in which the horizontal tray plate 38 extends over the ring 12 and under supporting angles 39 which are welded face to face and secured by bolts 40 to reenforcing flanges 42 on the main beam 44. This structure makes sealing somewhat easier as the tray may be continuous.

In some cases, as for example in using high tensile strength light gauge metal, it may be desirable to use a box section beam 50 as shown in Figs. 8 and 9. This may be formed from a single sheet of metal formed into an inverse U shape having laterally extended projections 50a, side walls 50b and a flat top 50c. The fixed end of such a beam as shown in Figs. 8 and 9 includes an L shaped extension piece 51, the horizontal portion 51a overlying the ring 12 and the vertical portion 51b being welded to gusset members 52 and 53. The tray 54 is secured by bolts 55.

The detachable end of such a beam is shown in Figs. 10 and 11, the detachable element being generally indicated at 60. It includes the angle shaped extension piece 61 having the depending arm 61a which is suitably welded to a box section 62, such box section being bolted to the beam 50 by bolts 63.

The tray 54 closely embraces the overlying angle portion 61b and may be sealed for liquid tight relation in any desired manner.

Where non-corrosive materials are fractionated I can obtain unexpected economies in using standard I beams out of which the tray beams are made. This is more particularly shown in Figs. 12 to 15 inclusive. By reference to Figs. 14 and 15, the I beam 65 may be cut as along lines 66, not only forming the lower beam 65a but also forming two truncated end pieces 67.

It will be understood that I beams are frequently sixty feet long or longer and it will be possible to form several beams of the desired length from the upper and lower part of the beam. A common slope is fixed for the cuts 66 which will produce the desired moments of inertia for deflection and take care of end shear. In this manner it is possible to get nearly double the lineal length of beams from a single I beam and in addition, obtain the desired miscellaneous end pieces which will act as the required extension supports. These extension pieces are readily bolted as at 68 and thus reduce overall weight and increase stress efficiency.

Beams of this type are especially useful with shower deck types of trays 69 and by eliminating uneffective web depth and arranging the beams longitudinally to the vapor flow as represented by the arrows 70, greater vapor space than usual is afforded or the minimum vertical spacing may be reduced. Assuming a five inch web saving per deck in a column having 35 decks it will be possible to reduce the height of the column nearly fourteen feet by this arrangement. Cross members 71 may be used to hold the beams 65 in the desired spaced positions. The trays 69 are arranged to provide a vapor flow opening between the web portions of the spaced beams 65 at one side only of the column 10, with the vapor flow openings of adjacent decks disposed at opposite sides of the column.

It will thus be seen that the main feature of my invention is the provision of a bubble or shower tray beam assembly for distillation columns in which the beam is so much shallower than usual and is arranged longitudinally in the path of vapor flow that the tray spacing may be much lower than usual. Further, my invention provides for a tray assembly including transverse beams much of which can be prefabricated and can be introduced into the column at one time and lowered into position without previous location of supports. The beams may be readily completed in length and made rigid by a simple extension which rides free or floats on the reenforcing ring and does not interfere with tray sealing. The device is thus rugged, simple and inexpensive and greatly facilitates tower assembly. It is made more economical with careful cutting of standard steel shapes all parts of which can be utilized.

While I have shown preferred forms of embodiment of my invention, I am aware that other modifications may be made thereto.

I claim:

1. A distillation column having a plurality of annular reinforcing rings mounted at spaced levels therein; and a tray construction associated with each ring, each of said tray constructions including a plurality of beams of T shape cross-section extending in spaced parallel relation across the column within the respective ring with the flange portions of the beams uppermost and the web portions depending vertically, said beams each having an integral vertical web extending over and beyond the flange portion at one end and resting freely on the upper side of the ring, a detachable extension of inverted T shape in cross-section mounted on the flange portion of the other end and resting freely on the upper side of the ring, means detachably securing the flange of the detachable extension to the flange portion of the beam, and perforate tray means mounted on the flange portions of the beams and arranged to provide a vapor flow opening between the end portions of the beams at one side only of the column, the vapor flow openings of adjacent tray constructions being at opposite sides of the column, and the spaces between the web portions of said beams being substantially unobstructed.

2. A distillation column having a plurality of annular reinforcing rings mounted at spaced levels therein; and a tray construction associated with each ring, each of said tray constructions including a plurality of beams of T shape cross-section extending in spaced parallel relation across the column within the respective ring with the flange portions of the beams uppermost and the web portions depending vertically, said beams each having an integral vertical web extending over and beyond the flange portion at one end and resting freely on the upper side of the ring, a detachable extension of inverted T shape in cross-section mounted on the flange portion of the other end and resting freely on the upper side of the ring, screw means detachably securing the flange of the detachable extension to the flange portion of the beam, said integral vertical web and said detachable extension being arranged to support the flange portion of each beam in the plane of the upperside of the ring, and perforate tray means mounted on the flange portions of the beams and arranged to provide a vapor flow opening between the end portions of the beams at one side only of the column, the vapor flow openings of adjacent tray constructions being at opposite sides of the column, and the spaces between the web portions of said beams being substantially unobstructed.

CHARLES W. BLAZER.

REFERENCES CITED

The following references are of record in the file of this patent:

UNITED STATES PATENTS

| Number | Name | Date |
|---|---|---|
| 1,123,232 | Brassert et al. | Jan. 5, 1915 |
| 1,209,195 | Orilio | Dec. 19, 1916 |
| 1,563,118 | Tonnelier | Nov. 24, 1925 |
| 1,937,958 | Huff | Dec. 5, 1933 |
| 2,008,557 | Lambert | July 16, 1935 |
| 2,106,602 | Hunter | Jan. 25, 1938 |
| 2,139,788 | Woolson | Dec. 13, 1938 |
| 2,235,865 | Burgess | Mar. 25, 1941 |
| 2,241,674 | Mohr, Jr., et al. | May 13, 1941 |
| 2,319,814 | Harmon | May 25, 1943 |
| 2,326,688 | Sasso | Aug. 10, 1943 |
| 2,341,091 | Glitsch | Feb. 8, 1944 |
| 2,386,161 | Hawes | Oct. 2, 1945 |
| 2,403,853 | Fromson | July 9, 1946 |
| 2,491,726 | Glitsch | Dec. 20, 1949 |